US012733620B2

(12) United States Patent
Hallén Sandgren et al.

(10) Patent No.: US 12,733,620 B2
(45) Date of Patent: Sep. 15, 2026

(54) MILK SYSTEM FOR ALLOWING ATTACHMENT OF TEAT CUPS

(71) Applicant: DELAVAL HOLDING AB, Tumba (SE)

(72) Inventors: Charlotte Hallén Sandgren, Tumba (SE); Carl Oskar Paulrud, Tumba (SE)

(73) Assignee: DeLaval Holding AB, Tumba (SE)

( * ) Notice: Subject to any disclaimer, the term of this patent is extended or adjusted under 35 U.S.C. 154(b) by 303 days.

(21) Appl. No.: 18/713,005

(22) PCT Filed: Nov. 22, 2022

(86) PCT No.: PCT/SE2022/051084
§ 371 (c)(1),
(2) Date: May 23, 2024

(87) PCT Pub. No.: WO2023/096553
PCT Pub. Date: Jun. 1, 2023

(65) Prior Publication Data

US 2025/0017165 A1 Jan. 16, 2025

(30) Foreign Application Priority Data

Nov. 26, 2021 (SE) .................................. 2151441-9

(51) Int. Cl.
*A01J 5/017* (2006.01)
*A01J 5/01* (2006.01)

(52) U.S. Cl.
CPC .................................. *A01J 5/017* (2013.01); *A01J 5/01* (2013.01)

(58) Field of Classification Search
CPC .................................. A01J 5/01; A01J 5/017
See application file for complete search history.

(56) References Cited

U.S. PATENT DOCUMENTS

2002/0185070 A1 12/2002 Espada et al.
2010/0116211 A1 5/2010 Sundborger
(Continued)

FOREIGN PATENT DOCUMENTS

AU 2009202368 A1 1/2010
DE 20122845 U1 8/2008
(Continued)

OTHER PUBLICATIONS

International Search Report for PCT/SE2022/051084, mailed Jan. 30, 2023, 3 pages.
(Continued)

*Primary Examiner* — Magdalena Topolski
*Assistant Examiner* — Edgar Reyes
(74) *Attorney, Agent, or Firm* — NIXON & VANDERHYE

(57) ABSTRACT

A milk system, including a milk extracting arrangement; an animal identifier device; a milk flow meter; a time measurement device; and a database storing milk flow data. The milk flow data includes milk flow rates of a milk session; and a measured time period between milk sessions; and a control unit, configured to: obtain the milk flow data from the database; determine a criterion of the milk flow rates at a moment of the milk session; set the time period of a milk interval; and allow the milk extracting arrangement to attach the teat cups to the animal when the set time period has passed.

13 Claims, 7 Drawing Sheets

(56) References Cited

U.S. PATENT DOCUMENTS

| | | | | |
|---|---|---|---|---|
| 2011/0155065 | A1 | 6/2011 | Johansson et al. | |
| 2012/0012059 | A1* | 1/2012 | Arvidsson | A01J 5/045<br>119/14.08 |
| 2020/0396953 | A1* | 12/2020 | Paulrud | A01J 5/01 |
| 2023/0225283 | A1* | 7/2023 | Rehnström | A01J 5/007<br>119/14.08 |
| 2023/0371462 | A1* | 11/2023 | Van Der Kamp | A01J 5/007 |

FOREIGN PATENT DOCUMENTS

| | | | | |
|---|---|---|---|---|
| NL | 8903163 | A | 7/1991 | |
| WO | 2019182497 | A2 | 9/2019 | |
| WO | WO-2019221659 | A1 * | 11/2019 | A01J 5/007 |

OTHER PUBLICATIONS

Written Opinion of the ISA for PCT/SE2022/051084, mailed Jan. 30, 2023, 9 pages.

Swedish Search Report dated Jun. 27, 2022, for SE 2151441-9, 2 pages.

* cited by examiner

MILK SYSTEM FOR ALLOWING ATTACHMENT OF TEAT CUPS

CROSS-REFERENCE TO RELATED APPLICATIONS

This application is the US national stage of PCT/SE2022/051084, filed Nov. 22, 2022 and designating the United States, which claims the priority of SE 2151441-9, filed Nov. 26, 2021. The entire contents of each foregoing application are incorporated herein by reference.

TECHNICAL FIELD

This document discloses a milk system. More particularly, a milk system is described, for setting a point in time of a subsequent milk permission between a latest milk session and the subsequent milk session of an animal, based on a determined criterion and allow a robotic arm of the milk extracting arrangement to attach teat cups to the teats of the animal when the set point in time of the subsequent milk permission has passed.

BACKGROUND

Dairy farms often comprise automatic milking systems, which also sometimes may be referred to as a voluntary milking system or robotic milking. The animals may then be allowed to stroll around freely in a dwelling area and may visit an automatic milking equipment, such as a milking robot, rotating milking parlor, etc., for milking. The animals then may visit the automatic milking equipment voluntarily for being milked, tempted by palatable nutrition offered at the automatic milking equipment (sometimes referred to as free cow traffic). Alternatively, the animal may be selected by a selection gate, leading the animal to the automatic milking equipment when passing between different sections of a farm, for example a resting area and a fodder area (sometimes referred to as forced cow traffic).

For avoiding that any animal visit the automatic milking equipment too frequently, animals are prohibited to enter the automatic milking equipment before a milk permission has been granted to the animal. The milk permission is provided when a certain time period has passed since the last milking event of the animal.

The time interval for the milk permission may in previously known solutions for example be set to a fixed time for all animals at the farm.

However, the milk production of animals are very individual dependent on various factors such as e.g. breed, genetic predisposition, age, udder fill, lactation curve position, etc., but possibly also quality and amount of animal feed, water supply, and general health and well being of the animal.

It is a problem to determine the point in time of a subsequent milk permission for the subsequent milk session, as the ideal point in time is individual for each animal. In case the milking interval is too long, the milk yield is affected. A too long milking interval may also cause mastitis at the animal teats.

If the milking interval is too short, the milking time of the animal is extended: Longer time spent in the milking robot during the milking session leads to ineffective usage of the milking equipment, i.e. that less animals than theoretically possible are served by each milking robot. Also, the teats of the animal may be injured by the milking vacuum in case the milking interval is too short.

The milk ejection of an animal consists of oxytocin release and the contractive effect of oxytocin on the alveolar tissue of the animal. The time from stimuli to ejection may be divided into: time from stimuli to oxytocin release, the time from oxytocin release to effect on alveolar tissue and the time from contraction of the alveolar tissue to onset of ejection (when milk is released from the alveolar tissue into the cisternal tissue). The time from stimuli to oxytocin release and the time from oxytocin release to effect on alveolar tissue are rather constant while the time from contraction of the alveolar tissue to onset of ejection is highly dependent on the udder fill.

The time that pass from contraction of the alveolar tissue until milk is eventually released into the cisternal tissue of the animal and made available for extraction may be individual for different animals based on various factors. The alveolar cavities may be modelled as a sponge that is squeezed and starts to “leak” at various stages/time/length of compression. Consequently, two animals with the very same yield may have had totally different udder fill.

The animal with the full udder may faulty be categorized as an animal needing short stimulation while the animal with the half full udder may be categorized as an animal needing longer stimulation. The truth may in this example be that they both need the same amount of stimulation but the half full animal needs longer time between stimuli and onset of milk extraction, i.e. will occupy the milking equipment for a longer time than the animal with full udder during the milking session.

It would thus be desired to find a way to determine individual milking intervals for diary animals, in order to optimize or at least improve milk yield while time spent at the milking equipment for each animal is minimized or at least reduced, possibly for allowing more animals to be served by the milking robot.

SUMMARY

It is therefore an object of this invention to solve at least some of the above problems and determine when to give milk permission to an animal and allow milk extraction of the animal in a milk extracting arrangement.

According to a first aspect of the invention, this objective is achieved by a milk system. The milk system comprises a milk extracting arrangement. The milk extracting arrangement is configured to extract milk from an animal during a milk session via teat cups, attached to teats of the animal by a robotic arm. Also, the milk system comprises an animal identifier device configured to determine identity of the animal. In addition the milk system also comprises a milk flow meter configured to measure milk flow rate of the extracted milk of the animal during the milk session. The milk system additionally comprises a time measurement device configured to measure time. The milk system furthermore comprises a database, in which milk flow data of the animal is stored.

The milk flow data comprises milk flow rates of at least one teat during at least a commencing section of at least one milk session. Also, the milk flow data comprises a measured time period between two consecutive milk sessions, associated with the respective milk flow rates of the latest milk session of the two consecutive milk sessions and an identity reference of the animal.

The milk system also comprises a control unit communicatively connected to the milk extracting arrangement, the database, the animal identifier device, the time measurement device, and the milk flow meter. The control unit is configured to obtain the milk flow rates of at least one teat during at least the commencing section of at least one milk session of the animal from the database. In addition, the control unit is configured to determine a criterion based on the milk flow rates of at least one teat during at least the commencing section of at least one milk session at a point in time of the commencing section of at least one milk session of the animal. The control unit is furthermore configured to set the point in time of a subsequent milk permission between the latest milk session and the subsequent milk session of the animal, based on the determined criterion. In addition, the control unit is configured to allow the robotic arm of the milk extracting arrangement to attach the teat cups to the teats of the animal when the set point in time of the subsequent milk permission has passed.

Thanks to the described aspects, by setting the point in time of the subsequent milk permission, based on the determined criterion based on the milk flow rates, the milk interval is set when the udder of the animal is estimated to be full, which leads to a swift and brief milk session when entering the milk extracting arrangement.

By shortening the time each animal served by the milk extracting arrangement/milking robot, is spending occupying the milk extracting arrangement, it becomes possible to serve more animals per time unit by the milk extracting arrangement. Thereby the milk extracting arrangement is more efficiently used and the total milk yield at the farm is increased, as more animals may be served by the milk extracting arrangement, thanks to the optimized milk intervals.

In an implementation of the milk system according to the first aspect, the database may be configured to store milk flow data of a plurality of milk sessions of the animal. The control unit may be configured to evaluate the milk flow data of the plurality of milk sessions of the animal obtained from the database and determine a reference criterion interval based on the evaluated milk flow data. The control unit may also be configured to set the point in time of the subsequent milk permission, based on a comparison between the determined criterion and the determined reference criterion interval.

The reference criterion interval may thereby be determined in a reliable way, as it is based on more data measurements of the plurality of milk sessions of the animal.

In an implementation of the milk system according to the first aspect, the determined criterion may comprise a curvature section of the milk flow rates at the point in time of the commencing section of at least one milk session of the animal.

It has been discovered that the shape of the curvature section of the milk flow rates at the determined point in time, the udder fill of the animal is predicted in an easily achieved, yet reliable way.

In an implementation of the milk system according to the first aspect, the determined criterion may comprise a gradient of the milk flow rates at the moment of the commencing section of at least one milk session of the animal.

It has been discovered that the shape of the gradient section of the milk flow rates at the determined point in time, the udder fill of the animal is predicted in an easily achieved, yet reliable way.

In an implementation of the milk system according to the first aspect, the control unit may be configured to compare the determined gradient with a reference gradient interval. The control unit may also be configured to set the point in time of the subsequent milk permission of the subsequent milk session for the animal to a milk interval between the latest milk session and the point in time of the subsequent milk permission, in relation to a previously applied time period of the milk interval for that animal by either increasing the milk interval when the determined gradient is smaller than the reference gradient interval; or decreasing the milk interval when the determined gradient exceeds the reference gradient interval; or otherwise maintain the previously applied milk interval when the determined gradient is within the reference gradient interval.

As the required time between milk sessions for achieving (sufficiently) udder fill of the animal will vary over time during the lactation cycle of the animal, it will not be optimal to grant the subsequent milk permission after a predetermined time interval. Instead, a previously used time interval for setting the point in time of the milk permission and the corresponding udder fill during the subsequent milk session may be used as a starting point for comparison with the gradient and adjusting the milk interval depending on the outcome of the comparison. An optimal milk interval may thereby be achieved by continuously made minor adjustments through the milk cycle.

In yet an implementation of the milk system according to the first aspect, the control unit may be configured to determine the point in time in the commencing section of the milk session, based on detection of when a main milking phase of alveolar milk release commence.

Recent research has discovered a correspondence between udder fill of the animal during a milk session and the shape of a curvature section of the milk flow rates, such as the gradient of the milk flow rates, at the point in time when alveoli milk is ejected by the animal; i.e., the inclination of the milk flow rate at the alveoli milk release. Thus, the inclination of the gradient of the milk flow rates at the alveoli milk release may be mapped to the particular point in time of the subsequent milk permission.

In another implementation of the milk system according to the first aspect, the control unit may be configured to determine the point in time of the commencing section of the milk session, based on evaluation of milk flow data obtained from the database.

By evaluating the milk flow data obtained from the database and in particular the milk flow rates during milk evacuation, the point in time where the alveoli milk release commence could be determined, as the alveoli milk release typically flow at a higher rate than the cistern milk release. Thus, a distinct change in milk flow rates at the commencing section of the milk curve could be interpreted as the point in time where alveoli milk is released.

In an additional implementation of the milk system according to the first aspect, the control unit may be configured to determine the point in time in the commencing section of the milk session, based on a predetermined point in time from commencement of the milk session.

It has been observed that the alveoli milk release, while being rather individual for a particular animal, the time from first teat stimulation to the alveoli milk release typically is very constant for the animal. By once determining the required stimulation time until release of alveoli milk for an animal, that time may be used sequentially for estimating the point in time where alveoli milk is released.

In an implementation of the milk system according to the first aspect, the milk system may comprise a milk conductivity meter, communicatively connected to the control unit. The milk conductivity meter may be configured to measure conductivity of milk extracted during the commencing section of the milk session. The control unit may also be configured to obtain, repeatedly, conductivity measurements of milk extracted during the commencing section of the milk session from the milk conductivity meter; and determine the point in time of the commencing section of the milk session, based on the obtained conductivity measurements.

Inventive research has discovered that electric conductivity of the extracted milk is lower in alveoli milk than in cistern milk. The reason is related to the fact that alveoli milk comprises more fat than the cistern milk, which in turn affect the conductivity.

Thus, by continuously measuring the conductivity of the extracted milk during at least the commencing section of a milk session, the point in time where alveoli milk is released is reliably detected by detecting a sudden change in milk conductivity of the extracted milk.

In yet an implementation of the milk system according to the first aspect, the control unit may be configured to store the set point in time of the subsequent milk permission associated with the identity reference of the animal in the database.

By storing the set point in time of the subsequent milk permission for the particular animal, it becomes possible to check whether the animal upon approaching the animal identifier device has a valid milk permission for being allowed to enter the milk extracting arrangement and access/denial may be given to the animal. Thereby the control unit is enabled to assure that animals not having a valid milk permission are not allowed to enter the milk extracting arrangement.

In another implementation of the milk system according to the first aspect, the control unit may also be configured to compare the time period of the milk interval to the set point in time of the subsequent milk permission with a maximum allowed time period and disallow setting of the milk interval to exceed the maximum allowed time period.

An excess time between two consecutive milk sessions may be harmful for the animal, resulting in mastitis, among other problems. Also, the milk production of the animal is affected, as the milk production has a tendency to decline when the udder fill is high. For these reasons, as a safety measure, a check is made to assure that the animal is provided milk permission in time, not to exceed the maximum allowed time period.

In an additional implementation of the milk system according to the first aspect, the control unit may also be configured to obtain the milk flow rates; determine the criterion based on the obtained milk flow rates; set the point in time of the subsequent milk permission; and allow the robotic arm of the milk extracting arrangement to attach the teat cups to the teats of the animal in real time, continuously during a lactation period of the animal.

It has been discovered that the optimal time period to the point in time of the subsequent milk permission between the latest milk session and the subsequent milk session will vary throughout the milk cycle of the animal. For example, when approaching the end of the milk cycle, it may typically take progressively longer time for the udder to reach a desired high level of udder fill. Thus, also the point in time of the subsequent milk permission with advantage is set dynamically and is continuously adjusted throughout the milk cycle.

In another implementation of the milk system according to the first aspect, the milk extracting arrangement, the animal identifier device, the milk flow meter, and the time measurement device may be physically situated at a farm while the database and the control unit may be physically situated at a distance from the farm, yet communicatively connected to the entities of the milk system situated at the farm.

Several advantages are achieved by separating computational resources and data storage from the farm and provide data storage and computational calculations as a service to the farmer. For example, the farmer does not have to invest in, and handle the computer/database and spend time on program updates, database back-ups, regular hardware updates, etc. By keeping the computer and database at a distant location, they are safe from the often dusty environment at a farm, possibly extending hardware lifetime and enhancing reliability of the computer/database. Also, centralization means that the computational resources could be shared between several farms, thereby utilizing the limited natural resources used for producing computers/databases better than having separate equipment at each farm, possibly leading to reduced environmental footprint.

In yet an additional implementation of the milk system according to the first aspect, the control unit may also be configured to calculate a capacity utilization of the milk extracting arrangement; and output an indication that the milk extracting arrangement has capacity to serve an amount of animals per time unit which is different from the currently served number of animals per time unit, based on the calculated capacity utilization.

Thereby, thanks to the optimization of the milk interval, i.e. the time between the last milk session and the point in time of the subsequent milk permission of the subsequent milk session, for all animals served by the particular milk extracting arrangement/milking robot, each animal occupy the milk extracting arrangement/milking robot, time is saved. Thus the milk extracting arrangement/milking robot will be idle for a certain amount of time. By counting and reporting the saved idle time at the milk extracting arrangement/milking robot to the farmer, he/she is informed about the increased capacity at the robot thanks to the provided solution and may invest in more animals that could be served by the same robot. Thereby the total milk yield at the farm is increased, without particular investments in new milk evacuating equipment.

Other advantages and additional novel features will become apparent from the subsequent detailed description.

FIGURES

Embodiments of the invention will now be described in further detail with reference to the accompanying figures, in which.

DETAILED DESCRIPTION

Embodiments of the invention described herein are defined as a milk system, which may be put into practice in the embodiments described below. These embodiments may, however, be exemplified and realized in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
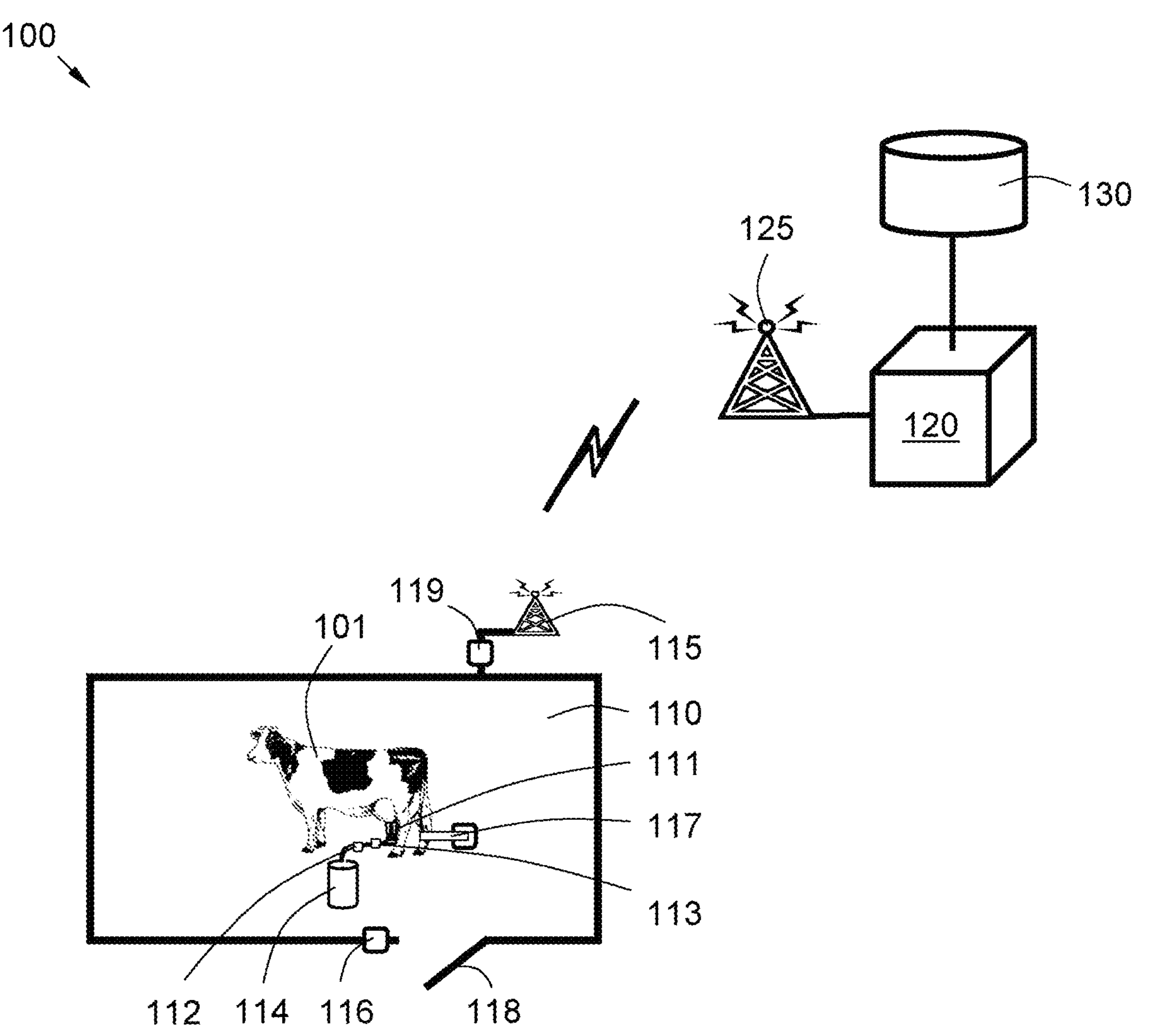
FIG. 1 illustrates an example of a system and an arrangement for adjusting a time period of a milk interval, according to an embodiment of the invention.

FIG. 1 illustrates a scenario with a milk system 100 for granting milk permission for a subsequent milk session of an animal 101, and adjusting a time period of a milk interval between a previous milk session and the point in time of the subsequent milk permission for the subsequent milk session. The animal 101 may be comprised in a herd of animals at a dairy farm.

"Animal" may be any arbitrary type of domesticated, milk producing female mammal, such as for example cow, goat, sheep, camel, dairy buffalo, yak, etc., although the discussed examples primarily are envisioned with cows in mind.

The milk system 100 is targeting setting a point in time of a subsequent milk permission between the latest milk session and the subsequent milk session of the animal 101, i.e., adjusting the time period of the milk interval from the latest milk session to the milk permission for the subsequent milk session of the animal 101.

Figure 2:
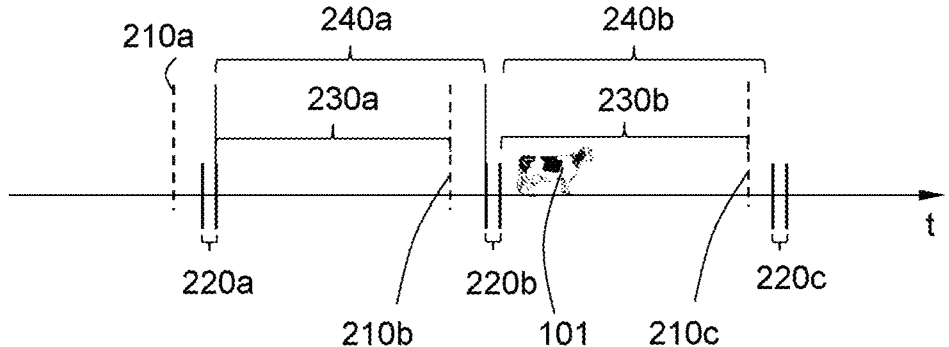
FIG. 2 illustrates a time line with examples of milk sessions and milk permissions of an animal.

The sequences of milk sessions, milk interval and milk permissions are schematically illustrated in FIG. 2 and further discussed in the corresponding section of the specification.

It has been discovered that the animal udder fill at the moment of milking, i.e. during the milking session will influence the length of the milk session. The more filled the udder is (up to a limit) when commencing the milking session, the faster the milk will be evacuated from the animal 101. Thus, the animal 101 will occupy the milk extracting arrangement 110 for a shorter time in comparison with being milked according to prior art solutions, leading to that more animals may be served by the same milk extracting arrangement 110. By using the milk extracting arrangement 110 more efficiently, the total milk yield at the farm is increased, without having to make investments in additional milking robots.

A reliable manner of determining the udder fill of the animal 101 is to determine a criterion such as a curvature section or gradient of milk flow rates at a moment of a commencing section of a milk session of the animal 101, when a main milking phase of alveolar milk release commence.

Figure 3:
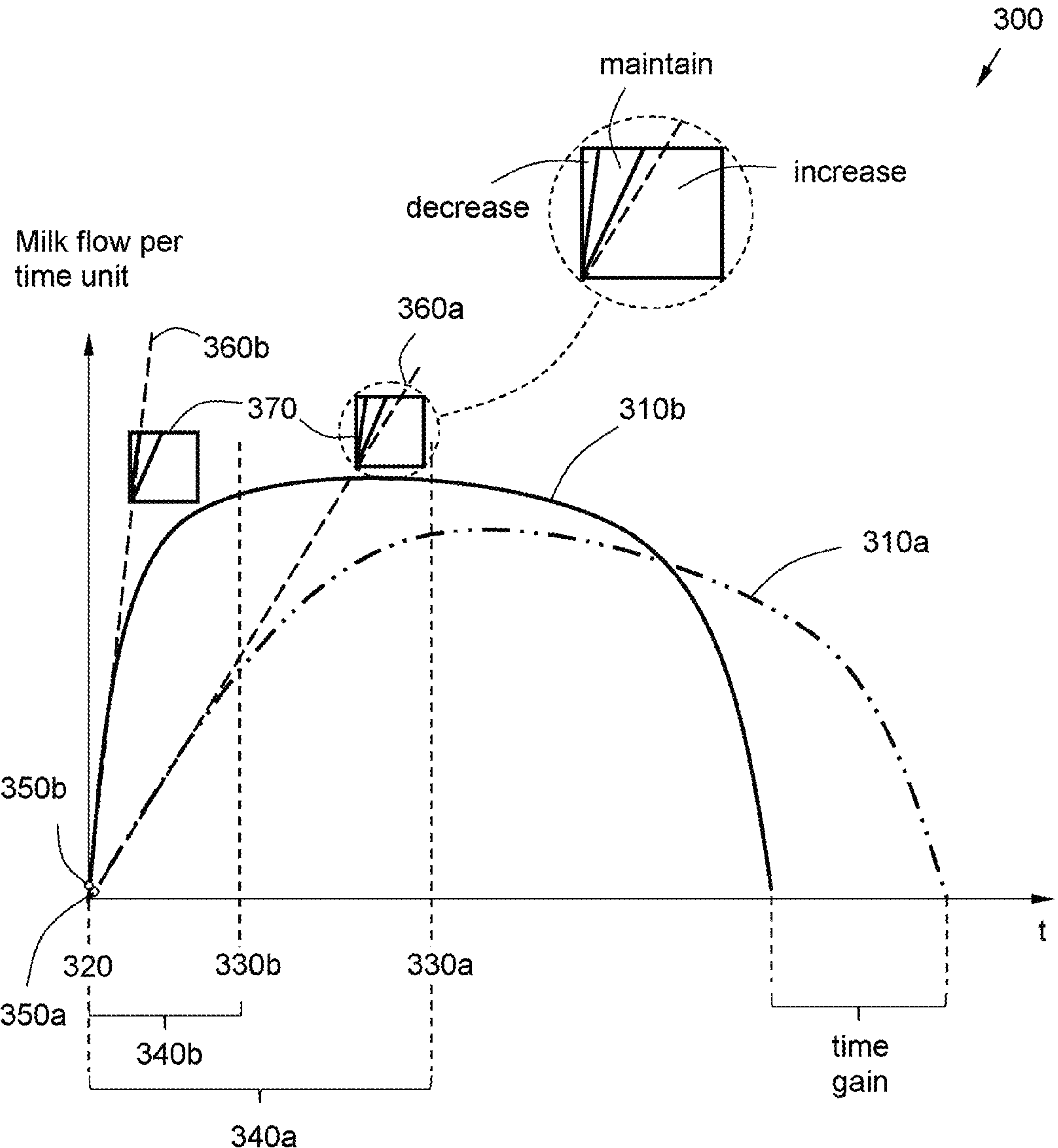
FIG. 3 illustrates examples of milking data plotted as the quantity of milk extracted from an animal per unit time.
Figure 4:
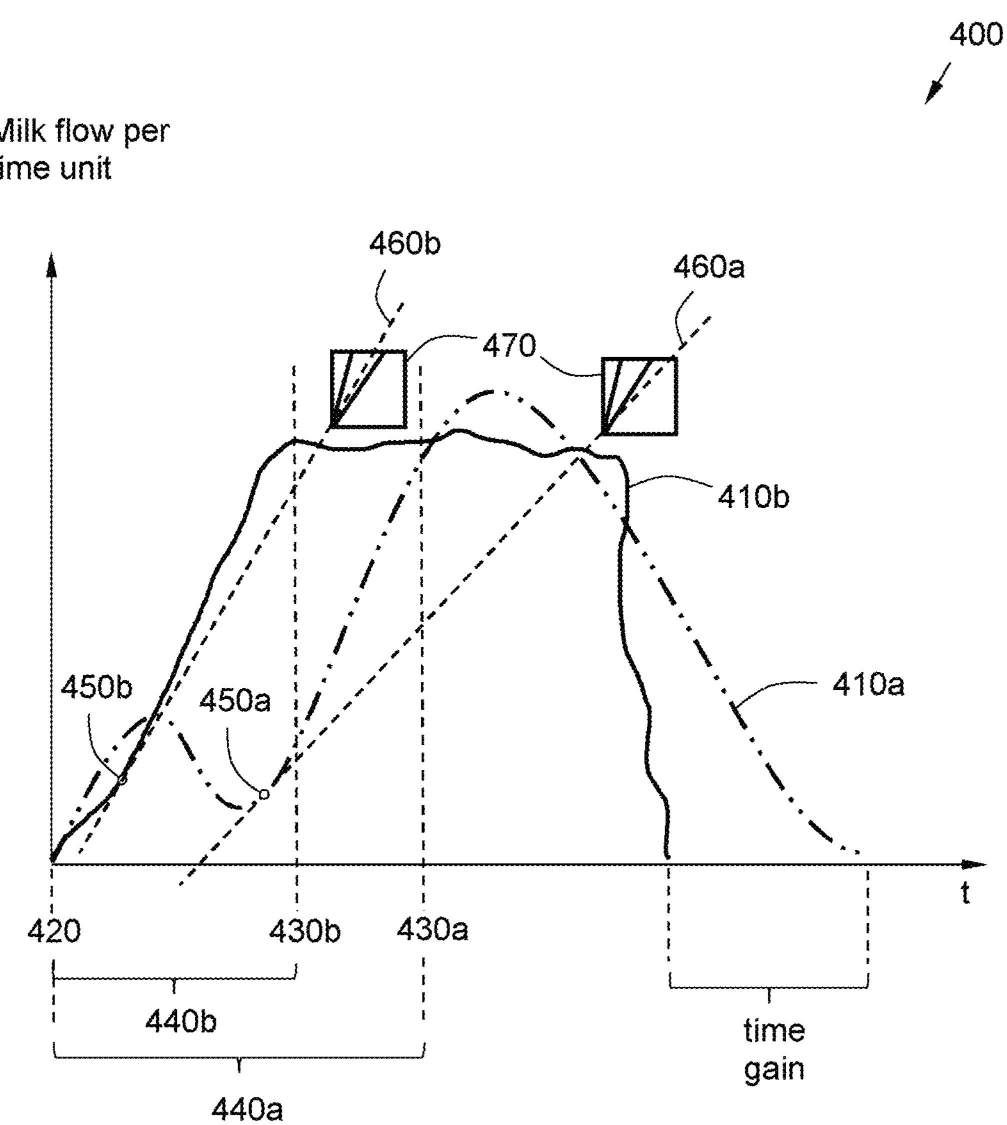
FIG. 4 illustrates examples of milking data plotted as the quantity of milk extracted from an animal per unit time.
Figure 5:
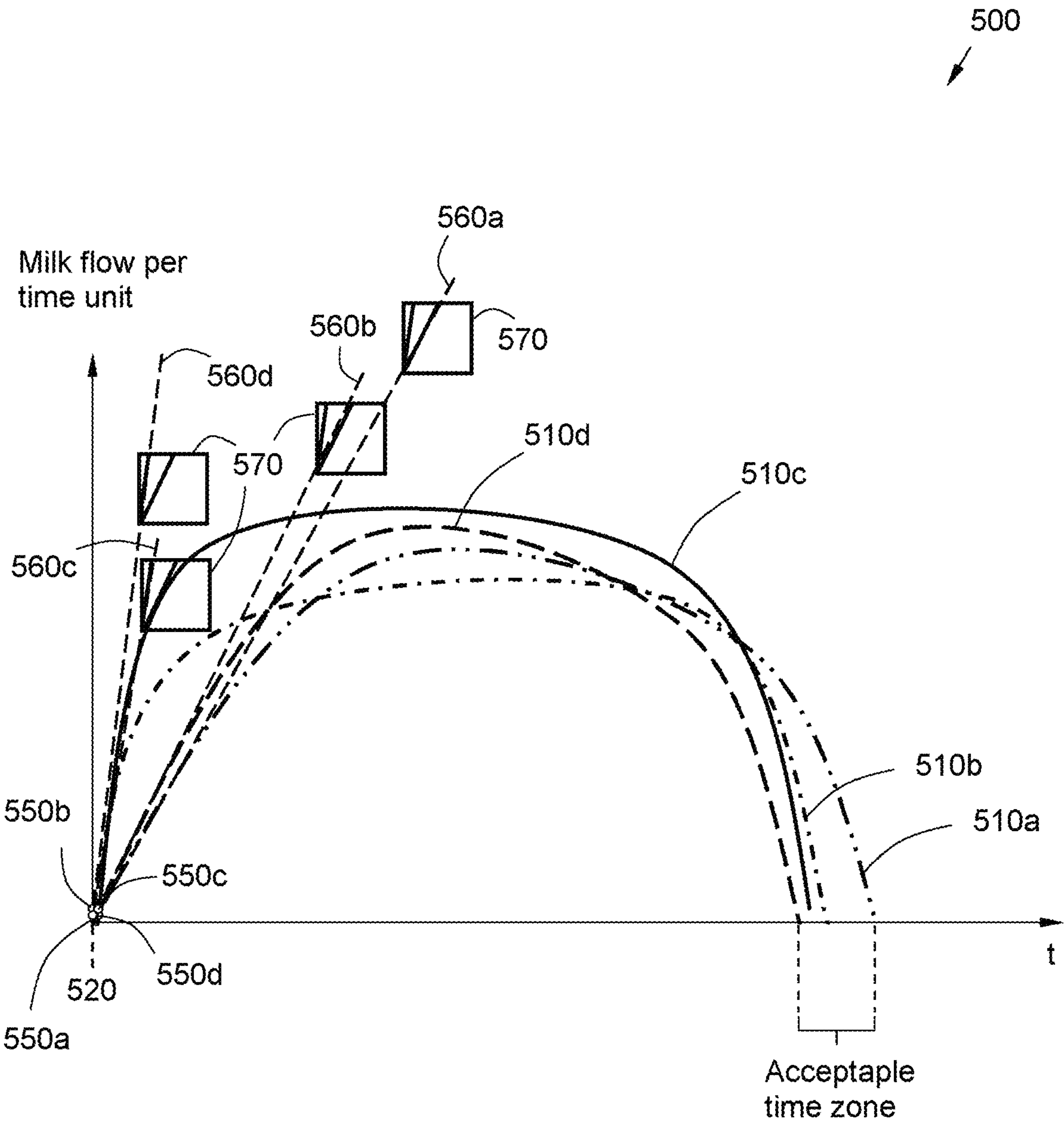
FIG. 5 illustrates examples of milking data plotted as the quantity of milk extracted from an animal per unit time.

Examples of determination of udder fill of the animal 101 and ways of determining the udder fill are schematically illustrated in FIGS. 3-5. However, firstly an example of the environment and setting of a farm wherein an embodiment of the milk system 100 implemented as illustrated in FIG. 1 will be presented.

In the illustrated embodiment, the animal 101 has been inlet into an area of a milk extracting arrangement 110 configured to extract milk from the animal 101 during a milk session. The milk extracting arrangement 110 may for example, but not necessarily, comprise a voluntary milk system robot or a rotary parlor in some embodiments. However, the milk extracting arrangement 110 may in some embodiments comprise other automatic milking equipment based on automatic/autonomous attachment of the teat cups 111 to the animal teats.

An animal 101 having a valid milk permission may be guided via a selection gate 118 and possibly via a passage to a holding area of the milk extracting arrangement 110; or alternatively directly into a milking position where the milking equipment/teat cups 111 may be attached onto the teats of the animal 101, for example by a robotic arm 117 when a set time period of the milk interval has passed.

The milk extracting arrangement 110 may comprise an animal identifier 116, which may identify the particular animal 101 for example when approaching the selection gate 118 or otherwise entering the milk extracting arrangement 110, and a check of the validity of the milking permission.

The animal identifier 116 may for example recognize the animal 101 by identifying a tag emitting wireless signals, for example an RFID tag or Bluetooth tag with a unique encoding which is associated with the animal 101.

The tag may be attached to one or both ears of the animal 101, arranged in a necklace around the neck of the animal 101, under the hide of the head of the animal 101, around a horn of the animal 101, in a headwear or other similar arrangement of the animal 101.

The tag may comprise an identifying animal unit, i.e. a transponder comprising an identity reference of the animal 101. The tag may emit wireless signals which may be received by the animal identifier 116, which may comprise an appropriate transceiver.

However, the animal identifier 116 may comprise a camera, and the animal 101 may be identified by image recognition, as animals e.g. cows typically have distinctive color signs on the hide, in combination with size and other differences in body constitution. Also, or alternatively an identification number encoded in a graphic encoding such as e.g. barcode, European Article Number (EAN) code, data matrix, Quick Response (QR) code on the tag or directly on the hide of the animal 101. Any other convenient method for identification may be utilized in some embodiments.

The animal identifier 116 may be communicatively connected to a control unit 120. The control unit 120 may comprise a digital computer or processing circuitry that controls one or more electrical systems, or electrical sub systems, of the farm, based on e.g. information read from the animal identifier 116 and other sensors of the farm. The control unit 120 is communicatively connected to a database 130.

The milk extracting arrangement 110, the animal identifier device 116, the milk flow meter 112, and the time measurement device 119 may in some embodiments be physically situated at the farm while the database 130 and the control unit 120 may be physically situated at a distance from the farm, yet communicatively connected to the other entities of the milk system 100 situated at the farm, via wired or wireless communication means.

When the control unit 120 successfully has identified the animal 101, based on the information of the animal identifier 116, a check whether the animal 101 has a valid milking permission may be made. The milking permission of the animal 101 may be stored in the database 130, associated with the identity reference of the animal 101.

In case the animal 101 has a valid milking permission, the control unit 120 may send a command to the selection gate 118 to open, thereby allowing the animal 101 to enter the milk extracting arrangement 110.

Teat cups 111 of the milk extracting arrangement 110 may then be attached to the teats of the animal 101, by usage of a robotic arm 117, when the set time period of the milk interval has passed, and the ejected milk may be collected in a milk tank 114. The milk flow per time unit may continuously be measured by a milk flow meter 112.

Milk flow of the animal 101 may be measured for the entire udder of the animal 101, or separately for each teat, referred to as quarter milking, in different embodiments. However, the subsequently presented and discussed examples are focusing on quarter milking.

In some embodiments, the conductivity of the extracted milk may be measured continuously or at particular moments during the milk extraction, by a milk conductivity meter 113. The milk conductivity meter 113, may be communicatively connected to the control unit 120, and configured to measure conductivity of milk extracted during the commencing section of the milk session.

Thanks to the conductivity measurements, it becomes possible to determine a switch between cistern milk extraction and alveoli milk extraction of the animal 101, as the conductivity of the cistern milk is lower than the conductivity of the alveoli milk, and a distinct deviation in conductivity of the extracted milk may be detected at the moment of commencement of alveoli milk extraction.

The milk flow data of the animal 101 may then be communicated with the control unit 120, for analysis.

The control unit 120 and the database 130 may be situated at the farm or distant, but communicatively connected to the milk extracting arrangement 110 and other devices at the farm, achievable via for example a subscription service, for example. The communication may for example be made over a wired or wireless communication interface between the farm and the control unit 120 and the database 130 of the service provider.

An advantage with having the control unit 120 and the database 130 centralized at the service provider is that the farmer does not have to make investments in the control unit 120/database 130. Neither is he/she required to make updates of software, running back ups of the system, exchange components etc., but is enabled to focus on animal welfare and milk production.

The database 130 is configured to store milk flow data of the animal 101. The milk flow data may comprise milk flow rates of at least one teat during at least a commencing section of at least one milk session. Also, the milk flow data may comprise a measured time period between two consecutive milk sessions, associated with the respective milk flow rates of the latest milk session of the two consecutive milk sessions and an identity reference of the animal 101.

It may be noted that the database 130 is not required to store the extracted quantity of milk per se of the animal 101, for the purpose of the provided solution, neither is the control unit 120 required to estimate udder fill of the animal 101 based on the extracted milk quantity of the last/any previous milk session. Instead, the udder fill of the animal 101 is estimated based on a curvature section or gradient of the milk flow rates at a moment when alveoli milk is released by the animal 101.

However, extracted milk yield may be measured and stored for other reasons, e.g. assisting the farmer in keeping track of milk production and animal health/conditions, for example.

The wireless communication interface may comprise, or at least be inspired by wireless communication technology such as Wi-Fi, Wireless Local Area Network (WLAN), Ultra Mobile Broadband (UMB), Bluetooth (BT) to name but a few possible examples of wireless communications in some embodiments. Alternatively, radio access technologies may be applied, such as e.g. $5^{th}$ Generation wireless system; $4^{th}$ Generation wireless system; $3^{rd}$ Generation wireless system, etc.

In order to optimize usage of the milk extracting arrangement 110, it is desired to not let the animals being allowed to be milked too often, as the animal 101 then must occupy the milk extracting arrangement 110 for an unnecessary long time. Meanwhile, it is important not to let the time to the subsequent milking permission be too long as the animal milk production/health may be affected.

It is desired to utilize the milk extracting arrangement 110 as efficiently as possible, i.e. to enable milk extraction of as many animals as possible per time unit. It thereby becomes possible for the farmer to increase the number of animals served by the milking robot, and thereby also increase the amount of extracted milk at the farm, without installing additional (or more efficient/expensive) milk extracting arrangement 110.

To achieve this target, it is desired to optimize the milk interval so that each animal 101 spend as little time as possible in the milk extracting arrangement 110; i.e., that it is avoided that the animal 101 is allowed to enter the milk extracting arrangement 110 when the animal 101 has a low udder fill.

Milk ejection of animals is caused by oxytocin release and the contractive effect of oxytocin on the alveolar tissue. The time from stimuli to ejection may be divided into: time from stimuli to oxytocin release, time from oxytocin release to effect on alveolar tissue, and time from contraction of the alveolar tissue to onset of milk ejection, i.e. when milk is released from the alveaolar tissue into the cisternal tissue.

The time from stimuli to oxytocin release, and the time from oxytocin release to effect on alveolar tissue are rather constant and individual for the animal 101 while the time from contraction of the alveolar tissue to onset of milk ejection is highly dependent on the udder fill.

The time that passes as contracting of the alveolar tissue until milk eventually is released into the cisternal tissue and made available for extraction is estimated from the milk flow curve. The alveolar cavities may be modelled as a sponge that is squeezed and starts to "leak" at various stages/time/length of compression. Therefore the onset of true milk flow, i.e. milk released from alveolar tissue, read from the milk flow curve is a reliable and direct indicator of the degree of udder fill, (irrespectively of individual milk yield of the animal) and may consequently be used as a controller on individual milk intervals rather than yield or time as such.

Consequently, two different animals producing the same milk yield may have had different udder fill during the milk session. An animal with full udder may faulty be categorized as an animal needing short stimulation time while the animal with the half full udder during the milk session may be categorized as an animal needing longer stimulation time. The latter animal will also occupy the milk extracting arrangement 110 for a longer time during the milking event.

It is desired to only allow animals with full, or almost full udders to access the milk extracting arrangement 110, in order to optimize usage of the milk extracting arrangement 110.

By analyzing the gradient or inclination of the milk flow curve at the moment of release of alveoli milk from the animal 101, the degree of udder fill of the animal 101 may be estimated, which information in turn may determine an appropriate length in time of the milk interval, i.e. the time to the next milk permission of the animal 101, so that animals are given milk permission at a moment when their udder is predicted to be full, or almost full.

Thus, milk flow data of the animal may be collected during one or several milking sessions at the milk extracting arrangement 110, associated with the animal identity and possibly a time reference. A point in time of a commencing section of milk session/s may then be determined, e.g. a point in time when a main milking phase of alveolar milk release commence. The gradient of the milk curve at this moment may then be determined and compared with a reference gradient, or reference gradient interval. Based on the outcome of the comparison, the point in time of a subsequent milk permission between the latest milk session and the subsequent milk session, i.e. the time period of the milk interval to the subsequent milk permission of the subsequent milk session may be set, for the particular animal 101, for example by adjusting a previously applied time period of the milk interval.

FIG. 2 graphically illustrates a timeline on which relations between milk permissions 210*a*, 210*b*, 210*c*; milk sessions 220*a*, 220*b*, 220*c*; time periods of the milk interval 230*b* from a previous milk session 220*a*, 220*b* and a subsequent milk session 220*b*, 220*c*; and measured time periods 240*a*, 240*b* between commencement of the respective milk session 220*a*, 220*b*, 220*c* and the end of the anterior milk session 220*a*, 220*b*, of the animal 101.

When the animal 101 has been provided with a milk permission 210*a*, 210*b*, 210*c*, she is allowed to enter the milking equipment 110 and commence a milk session 220*a*, 220*b*, 220*c*. The animal 101 may for example be sorted in a sorting gate 118 situated at a strategic placement between a resting/sleeping area where the animal 101 is relaxing, and an eating/recreation area of a barn where the animal 101 may eat, launch, socialize with other animals and enjoy being brushed with an installed rotating brush, for example.

As the animal 101 is moving between the different areas of the barn and/or outdoor areas several times during a day in a voluntary milking system, it may be captured and sorted out by the sorting gate 118. However, it may occur that the animal 101 for example just has gone to rest when the milk permission 210*a*, 210*b*, 210*c* is granted, it may take some time until the animal 101 passes the sorting gate 118 next time. Other reasons for delay may be queuing of animals to the milk extracting arrangement 110; that the animal 110 is sick or hurt; that the animal 101 has low rank and other animals do not allow her to enter the milk extracting arrangement 110.

In an example as illustrated in FIG. 2, the animal 101 has recently being milked in the milk session 220*b* and the time period of the milk interval 230*b* to the point in time of the subsequent milk permission 210*c* is to be set. The setting may be made based on analysis of milk flow data of the animal 101, from a database 130 from one or several previous milk sessions 220*a*, 220*b*.

For example, the latest time period of the milk interval 230*a* from the previous milk session 220*b* may be used as a starting point, when setting the time period of the milk interval 230*b* to the subsequent milk permission 210*c* of the subsequent milk session 220*c*.

Further, the udder fill of the animal 101 during the previous milk session 220*b* may be estimated at the point in time in the commencing section of the milk session 220*b*, when a main milking phase of alveolar milk release commence, by determine a gradient of the milk flow rate at this point in time. Some examples of milk curves and determination of the gradient are illustrated in FIGS. 3-5.

The determined milk flow rate gradient at the point in time may be compared with a reference gradient, or reference gradient interval.

The time period of the milk interval 230*b* to the subsequent milk permission 210*c* of the subsequent milk session 220*c* may then be set, in relation to the previously applied time period of the milk interval 230*a* by increasing the time period when the determined gradient is smaller than the reference gradient, in relation to the previously applied time period of the milk interval 230*a*.

The estimated time period 240*a* between the commencement of the milk session 220*b*, 220*c* and the end of the anterior milk session 220*a*, 220*b* may also influence the setting of the time period of the milk interval 230*b*. The animal 101 may not immediately enter the milk extracting arrangement 110 right after having been given milk permission 210*a*, 210*b*, 210*c*. At the opposite, the actual time period 240*a* between the commencement of the milk session 220*b*, 220*c* and the end of the anterior milk session 220*a*, 220*b* may vary between milk sessions 220*a*, 220*b*, 220*c*. Thus, an unusually long (exceeding a reference time or reference time interval) time period 240*a* between milk session 220*b*, 220*c* may result in very high udder fill, as may be indicated by the gradient at the moment of alveolar milk release of the animal 101, irrelevantly of the length of the time period of a milk interval 230*a* between a previous milk session 220*a* and grant of a milk permission 210*b*, why it may not be advised to set the time period of the milk interval 230*b* to a shorter time period in this scenario.

FIG. 3 schematically illustrate milk flow rates, i.e. milk flow per time unit of two distinct milk sessions 220*a*, 220*b*, 220*c* of an animal 101.

During a first milk session 220*a*, milk is extracted from the animal 101 in a milk flow rate 310*a* of at least one teat. This may be referred to as a milk curve.

Milk curves are typically different, firstly because of individual differences between animals, but also because different milk robots operate in different ways. Some robots may clean the animal teats with brushes, which also functions as tactile pre-stimulation of the teats, triggering oxytocin release. Other robots may use application of a cleaning teat cup and rinse the teat with water for cleaning/tactile oxytocin stimulation. Some robots may attach one teat cup 111 at the time, sequentially. Other robots may attach a pair of teat cups 111 at the time, or even all teat cups 111 simultaneously. Some robots may, after the cleaning/pre-stimulation, attach the teat cups 111 to the animal teats for milk evacuation, while other robots are using the same teat cups 111 both for cleaning/tactile pre-stimulation and milk evacuation while applying different vacuum levels/pulsation ratio, for example. In the illustrations of FIGS. 3-5, only some few examples of milk curves are depicted showing general principles, rather than all possible variants, as several parameters may influence the milk curve.

The lag time from start of tactile teat stimulation until onset of milk ejection may range from e.g. 40 seconds to more than 2 minutes for cows and depends on the degree of udder filling. The degree of udder filling is low at late stages of lactation and/or at short intervals from previous milk removal. At extremely low udder filling, milk ejection may occur as late as 3 min after the start of tactile teat stimulation, in some examples. It is desired to extend the milk interval 230*b* by setting the point in time of the subsequent milk permission 210*c* between the latest milk session 220*b* and the subsequent milk session 220*c* of the animal 101, for giving the animal 101 more time to fill the udder before the next milking session 220*b* and thereby decrease the time required in the milk extracting arrangement 110.

In the illustrated example of FIG. 3, the animal 101 has been pre-stimulated and cistern milk may have been extracted separately before the measurements of the illustrated graph. Thus, the milk session 220*a* starts at a point in time 320, and reach a maximum/working milk flow rate or a maximum/working plateau, or an interval around a maximum plateau or maximum flow rate 330*a*, such as for example within about 10% lower than the maximum milk flow per time unit level.

A commencing section 340*a* of the first milk session 220*a* is situated between the beginning 320 of the milk session 220*a* and the maximum plateau/flow rate 330*a*. In the illustrated example, the beginning 320 of the milk session 220*a* is identical with the point in time 350*a*, 350*b* where alveoli milk has started to flow from the animal 101. However, the beginning 320 of the milk session 220*a*, in other embodiments, may be set to e.g., the point in time when the teats of the animal 101 firstly are pre-stimulated; when the first teat cup 111 is attached to the teats of the animal 101; when all teat cups 111 have been attached to the teats of the animal 101; when the first cistern milk has been evacuated from the animal 101, etc. The selection of the point in time 320 of the beginning of the milk session 220*a* is per se not important for the implementation, as long as the same point in time 320 is applied consistently for all milk sessions 220*a*, 220*b*, 220*c*.

The gradient 360*a* of the milk flow rate 310*a* is then determined at a point in time 350*a* of the commencing section 340*a* of the milk session 220*a*. The point in time 350*a* in the commencing section 340*a* of the milk session 220*a*, may be determined based on detection or estimation of when a main milking phase of alveolar milk release commence.

The point in time 350*a* of the commencing section 340*a* of the milk session 220*a* may be determined based on evaluation of milk flow data 300 of previous milk sessions 220*a*, 220*b*, 220*c* obtained from the database 130, i.e. by detecting a deviation in inclination of the milk flow curve. The milk flow rate of alveoli milk release is typically more intense/steep than the milk flow rate of cistern milk release.

In some embodiments, the point in time 350*a* of the commencing section 340*a* of the milk session 220*a* may be determined based on evaluation of a continuously applied time period from commencement 320 of the milk session 220*a*; i.e., the same time period from commencement 320 of the milk session 220*a*, for example 10 seconds, 40 seconds or one minute, etc. may be applied for every milk sessions 220*a*, 220*b*, 220*c*. The moment of milk release may be regarded as relatively constant for a particular animal 101, why a constant time window may be applied for determining the point in time 350*a* of the commencing section 340*a*, for achieving comparable values.

Hereby, an estimation of the point in time 350*a* of the alveoli milk release of the animal 101 is estimated without having to make any particular measurements or computations besides time measurements.

In other embodiments, the point in time 350*a* of the commencing section 340*a* of the milk session 220*a* may be determined based on an obtained conductivity measurement, for example as obtained from milk a conductivity meter 113, communicatively connected to the control unit 120, configured to measure conductivity of milk extracted during the commencing section 340*a* of the milk session 220*a*, 220*b*, 220*c*. A change from a relatively high conductivity, to a, in relation, lower conductivity as measured at the extracted milk of the animal 101 is typically indicating the point in time 350*a* where alveoli milk is released.

The point in time 350*a* where alveoli milk is released is thereby reliably detected, based on the continuously extracted milk of the animal 101, which enable determination of the gradient 360*a* of the milk flow rate 310*a* at the point in time 350*a*, which in turn enable a reliable determination of udder fill of the animal 101 when commencing the milk session 220*a*, 220*b*, 220*c*.

Having determined the gradient 360*a* of the milk flow rate 310*a*, i.e. the inclination of the milk flow curve at the point in time 350*a* of the commencing section 340*a* of the milk session 220*a*, a comparison may be made with a reference gradient value, or reference gradient interval 370.

In case the determined gradient 360*a* is smaller than the reference gradient interval 370, i.e. the inclination of the gradient 360*a* is flatter than the lowest limit of the reference gradient interval 370, the milk interval 230*b*, i.e. the point in time of the subsequent milk permission 210*b* between the latest milk session 220*a* and the subsequent milk session 220*b* of the animal 101, is to be increased. This is the case in the illustrated example in FIG. 3.

In case the determined gradient 360*a* is within the reference gradient interval 370, the previously utilized milk interval 230*a* may be maintained, i.e. the same milk interval 230*a* may be applied when setting the point in time of the subsequent milk permission 210*b* between the milk session 220*a* and the subsequent milk session 220*b*.

When the determined gradient 360*a* is exceeding the reference gradient interval 370, i.e. being steeper than the upper limit of the reference gradient interval 370, the milk interval 230*b* may be decreased in some embodiments.

In the illustrated example, the comparison of the gradient 360*a* with the reference gradient interval 370 may result in that the time period of the milk interval 230*b* to the subsequent milk permission 210*c* of the subsequent milk session 220*c* should be set to a longer time period in comparison with the previously applied time period of the milk interval 230*a* between the previous milk session 220*a* and the grant of the milk permission 210*b*.

The result in the subsequent milk session 220*b* is schematically illustrated by the milk flow rate 310*b*. The gradient 360*b* of the milk flow rate 310*b* may then be determined at the point in time 350*b* of the commencing section 340*b* of the milk session 220*b*, which is radically steeper than the gradient 360*a* of the milk flow curve of the previous milk session 220*a*. Thereby, the milk flow rate 310*b* is reaching the maximum flow/plateau/interval 330*b* earlier than during the previous milk session 220*a*, which in turn leads to faster extraction of the milk and thereby a time gain in comparison with the previous milk session 220*a*, which is illustrated in the FIG. 3.

Hereby, more animals may be served and milked by the same milk extracting arrangement 110, leading to increased total milk yield at the farm.

FIG. 4 illustrates another example of schematically illustrated milk flow rates, i.e. milk flow per time unit of two distinct milk sessions 220*a*, 220*b*, 220*c* of an animal 101.

The commencement 420 of the milk session 220*a* may be regarded as the point in time when the first teat cup 111 is attached to the first animal teat.

In the illustrated example, the milk curve 410*a* of the first milk session 220*a* has a bimodal shape, i.e. the cistern milk is extracted from the animal 101, almost entirely before the alveoli milk has been released, resulting in a first minor peak, a dip and a subsequent major peak, as a result from alveoli milk release.

During a first milk session 220*a*, milk is extracted from the animal 101 in a milk flow rate 410*a* of at least one teat. The point in time 450*a* of alveoli milk release may be detected by studying the milk flow shape, in this case by spotting the increase in milk flow rate after the dip. The gradient 460*a* of the milk flow rates 410*a* at the point in time 450*a* of alveoli milk release may be determined and compared with the reference gradient interval 370.

The comparison in this case results in that the gradient 460*a* is smaller than the reference gradient interval 370, leading to an increase of the milk interval 230*a*, 230*b* by setting the point in time of the subsequent milk permission 210*b* between the latest milk session 220*a* and the subsequent milk session 220*b* of the animal 101 later than previously.

The next time the animal 101 is allowed to access the milk extracting arrangement 110 by having a valid milk permission 210*b*, the milk curve 410*b* has a completely different shape than during the previous milk session 220*a*, as the udder fill of the animal 101 is higher than at the previous milk session 220*a*. The point in time 450*b* of the estimated alveoli milk release may be determined by analysis of the milk curve 410*b*.

Again the gradient 460*b* of the milk flow rates 410*b* at the point in time 450*b* of alveoli milk release may be determined and compared with the reference gradient interval 470. In this case, the gradient 460*b* is within the reference gradient interval 470, why the previously applied milk interval 230*a*, 230*b* may be applied when setting the subsequent milk permission 210*c*.

As could be concluded by studying the graphs in FIG. 4, a considerable amount of time is gained for the individual animal 101. When these time gains are aggregated for all the animal crew served by the robot, the saved idle time at the robot is considerable and may allow for adding one or several animals to the crew.

FIG. 5 illustrates a plurality of milk flow curves 510*a*, 510*b*, 510*c*, 510*d*, from a plurality of milk sessions 220*a*, 220*b*, 220*c* of the same animal 101.

The point in time 550*a*, 550*b*, 550*c*, 550*d* of alveoli milk release may firstly be determined for each of the respective milk flow rates 510*a*, 510*b*, 510*c*, 510*d*.

The respective gradients 560*a*, 560*b*, 560*c*, 560*d* of the milk flow rates 510*a*, 510*b*, 510*c*, 510*d* at the determined point in time 550*a*, 550*b*, 550*c*, 550*d* of alveoli milk release may be determined.

The determined gradients 560*a*, 560*b*, 560*c*, 560*d* of milk curves 510*a*, 510*b*, 510*c*, 510*d*, wherein the milk sessions 220*a*, 220*b*, 220*c* have a respective time duration within an acceptable predetermined time zone. The upper and lower limits of the reference gradient interval 570 may be determined based on the determined gradients 560*a*, 560*b*, 560*c*, 560*d* of the milk curves 510*a*, 510*b*, 510*c*, 510*d*, for example by applying the determined gradients 560*a*, 560*b*, 560*c*, 560*d* being most extreme, yet having an acceptable duration of the milk session 220*a*, 220*b*, 220*c*, in some embodiments.

By determining the reference gradient interval 570 based on historical gradients at the passed milk sessions 220*a*, 220*b*, 220*c* of the animal 101, a reliable and robust control of the setting of the point in time of the subsequent milk permission 210*c* is achieved.

Figure 6:
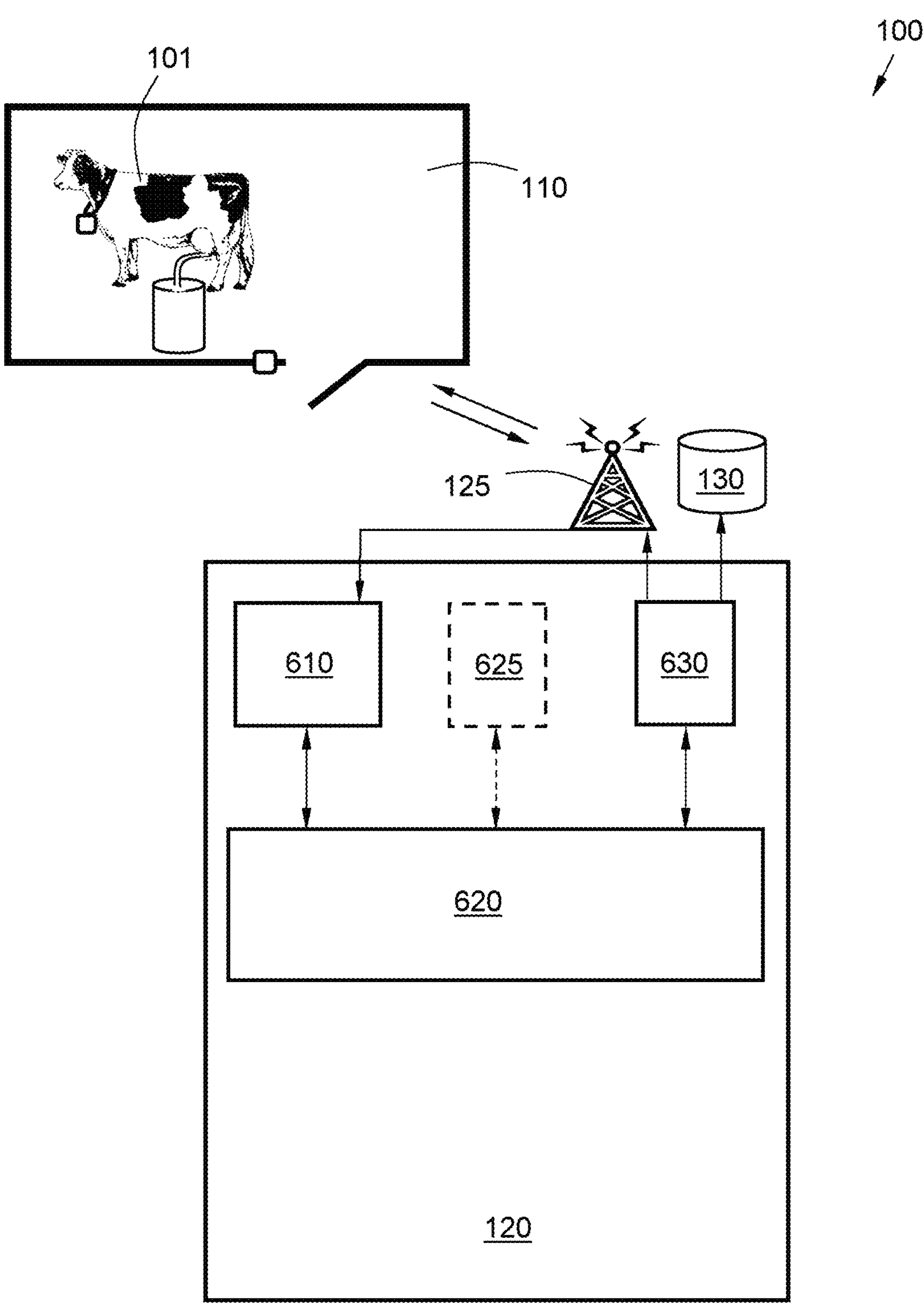
FIG. 6 illustrates examples of a control unit, an arrangement and a system for adjusting a time period of a milking interval, according to an embodiment of the invention.

FIG. 6 illustrates an embodiment of a milk system 100 for setting the time period of a milk interval 230*b* to a subsequent milk permission 210*c* of a subsequent milk session 220*c* based on a determined gradient 360*a*, 360*b*, 460*a*, 460*b*, 560*a*, 560*b* for an animal 101.

The milk system 100 comprises a control unit 120. The control unit 120 is communicatively connected to a milk extracting arrangement 110, the database 130, an animal identifier device 116, a time measurement device 119, and a milk flow meter 112. The control unit 120 is configured to obtain the milk flow rates 310*a*, 310*b*, 410*a*, 410*b*, 510*a*, 510*b*, 510*c*, 510*d* of at least one teat during at least the commencing section 340*a*, 340*b*, 440*a*, 440*b* of at least one milk session 220*a*, 220*b*, 220*c* of the animal 101 from the database 130.

Also, the control unit 120 is configured to determine a criterion 360*a*, 360*b*, 460*a*, 460*b*, 560*a*, 560*b*, 560*c*, 560*d* based on the milk flow rates 310*a*, 310*b*, 410*a*, 410*b*, 510*a*, 510*b*, 510*c*, 510*d* of at least one teat during at least the commencing section 340*a*, 340*b*, 440*a*, 440*b* of at least one milk session 220*a*, 220*b*, 220*c* at a point in time 350*a*, 350*b*, 450*a*, 450*b*, 550*a*, 550*b*, 550*c*, 550*d* of the commencing section 340*a*, 340*b*, 440*a*, 440*b* of at least one milk session 220*b* of the animal 101.

The control unit 120 is furthermore configured to set a point in time of a subsequent milk permission 210*c* between the latest milk session 220*b* and the subsequent milk session 220*c* of the animal 101, based on the determined criterion 360*a*, 360*b*, 460*a*, 460*b*, 560*a*, 560*b*, 560*c*, 560*d*.

Additionally, the control unit 120 is also configured to allow the robotic arm 117 of the milk extracting arrangement 110 to attach the teat cups 111 to the teats of the animal 101 when the set point in time of the subsequent milk permission 210*c* has passed.

The control unit 120 may comprise a receiver 610 configured to receive information from the milk extracting arrangement 110 via a wired or wireless connection, e.g. via a transceiver 125, from the milk extracting arrangement 110, the animal identifier device 116, the milk flow meter 112, the time measurement device 119, the database 130 and/or the milk conductivity meter 113.

The control unit 120 also comprises a processing circuit 620 configured for performing various calculations for conducting the described solution for setting the point in time of a subsequent milk permission 210*c* and allow the robotic arm 117 of the milk extracting arrangement 110 to attach the teat cups 111 to the teats of the animal 101 when the set point in time of the subsequent milk permission 210*c* has passed.

The processing circuit 620 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilized expression "processor" may thus represent a processing circuitry comprising a plurality of processing circuits, such as, e.g., any, some or all of the ones enumerated above.

Furthermore, the control unit 120 may comprise a memory 625 in some embodiments. The optional memory 625 may comprise a physical device utilized to store data or programs, i.e., sequences of instructions, on a temporary or permanent basis. According to some embodiments, the memory 625 may comprise integrated circuits comprising silicon-based transistors. The memory 625 may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

Further, the control unit 120 may comprise a signal transmitter 630. The signal transmitter 630 may be configured for transmitting signals via a wired or wireless communication interface to the milk extracting arrangement 110 and/or the database 130.

However, in some alternative embodiments, the milk system 100 may comprise additional units for performing the provided solution.

The above described method to be performed in the control unit 120 may be implemented through the one or more processing circuits 620 within the control unit 120, together with a computer program for performing at least some of the above-described functions. Thus, the computer program comprises instructions which, when the computer program is executed by the control unit 120 in the milk system 100, cause the control unit 120 to carry out the method for setting the point in time of a subsequent milk permission 210*c* and allow the robotic arm 117 of the milk extracting arrangement 110 to attach the teat cups 111 to the teats of the animal 101 when the set point in time of the subsequent milk permission 210*c* has passed.

The computer program mentioned above may be provided for instance in the form of a computer-readable medium, i.e. a data carrier carrying computer program code for performing at least some of the described method steps according to some embodiments when being loaded into the one or more processing circuits 620 of the control unit 120. The data carrier may be, e.g., a hard disk, a CD ROM disc, a memory stick, an optical storage device, a magnetic storage device or any other appropriate medium such as a disk or tape that may hold machine readable data in a non-transitory manner. The computer program may furthermore be provided as computer program code on a server and downloaded to the control unit 120 remotely, e.g. over an Internet or an intranet connection.

Figure 7:
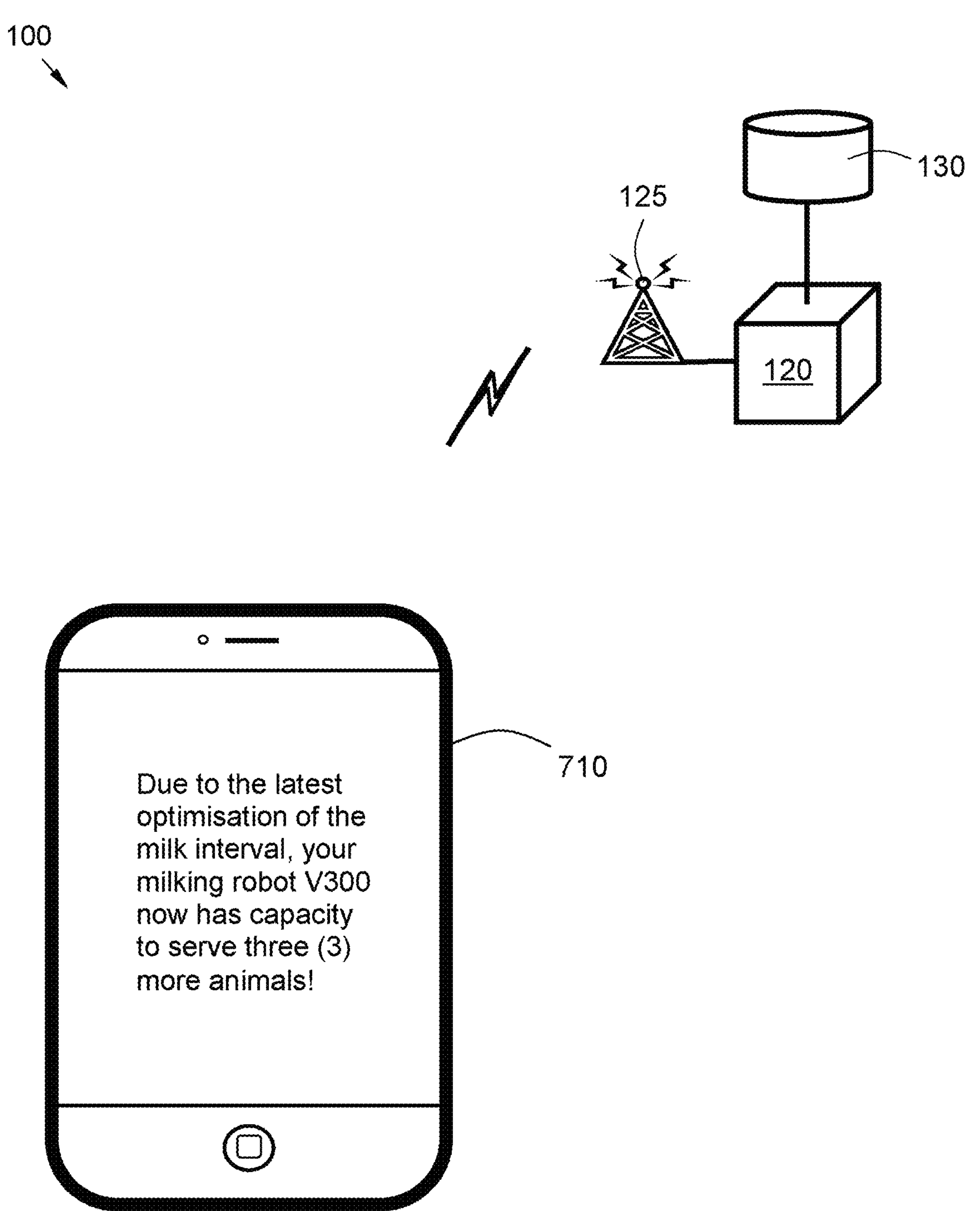
FIG. 7 illustrates an example of a milk system and a user equipment, according to an embodiment of the invention.

FIG. 7 schematically illustrates an example wherein the control unit 120 is configured to calculate a capacity utilization of the milk extracting arrangement 110, by estimating time that has been saved by performing the herein described method for setting the point in time of a subsequent milk permission 210*c*, thereby only allowing animals 101 having a high udder fill to enter the milk extracting arrangement 110 for milk extracting. By optimizing the milk interval 230*b*, the occupation time of each milk session 220*a*, 220*b*, 220*c* of each animal which is served by the robot is minimized. By adding these saved time periods, it may be estimated whether more animals/how many more animals that could be served by the robot.

This information/indication concerning idle capacity of the milking robot may then be output for example to a user device 710 of the farmer. The farmer is thereby informed about the increased capacity of the robot, to serve an increased amount of animals per time unit, which is different from the currently/previously served number of animals per time unit, based on the calculated capacity utilization.

By optimizing the usage of the milking robot/-s of the farm, the total milk yield is increased without additional investments in new/more efficient milking robot/-s.

The terminology used in the description of the embodiments as illustrated in the accompanying drawings is not intended to be limiting of the described milk system 100; the control unit 120; the method; the computer program and/or the computer-readable medium. Various changes, substitutions and/or alterations may be made, without departing from invention embodiments as defined by the appended claims.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures or features are recited in mutually different dependent claims, illustrated in different figures or discussed in conjunction with different embodiments does not indicate that a combination of these measures or features cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. A milk system (100), comprising:

a milk extracting arrangement (110) configured to extract milk from an animal (101) during a milk session (220*a*, 220*b*, 220*c*) via teat cups (111), attached to teats of the animal (101) by a robotic arm (117);

an animal identifier device (116) configured to determine identity of the animal (101);

a milk flow meter (112) configured to measure a milk flow rate of the extracted milk of the animal (101) during the milk session (220*a*, 220*b*, 220*c*);

a time measurement device (119) configured to measure time;

a database (130), in which milk flow data (300, 400, 500) of the animal (101) is stored, the milk flow data (300, 400, 500) comprising:

the milk flow rates (310*a*, 310*b*, 410*a*, 410*b*, 510*a*, 510*b*, 510*c*, 510*d*) of at least one of the teats during at least a commencing section (340*a*, 340*b*, 440*a*, 440*b*) of at least one said milk session (220*a*, 220*b*, 220*c*); and a measured time period (240*a*) between two consecutive said milk sessions (220*a*, 220*b*, 220*c*), associated with the respective milk flow rates (310*a*, 310*b*, 410*a*, 410*b*, 510*a*, 510*b*, 510*c*, 510*d*) of a later (220*a*, 220*b*, 220*c*) of the two consecutive milk sessions (220*a*, 220*b*, 220*c*) and an identity reference of the animal (101); and a control unit (120) communicatively connected to the milk extracting arrangement (110), the database (130), the animal identifier device (116), the time measurement device (119), and the milk flow meter (112), wherein the control unit (120) is configured to:

obtain the milk flow rates (310*a*, 310*b*, 410*a*, 410*b*, 510*a*, 510*b*, 510*c*,510*d*) of at least one of the teats during at least the commencing section (340*a*, 340*b*, 440*a*, 440*b*) of at least one said milk session (220*a*, 220*b*, 220*c*) of the animal (101) from the database (130);

determine a criterion (360*a*, 360*b*, 460*a*, 460*b*, 560*a*, 560*b*, 560*c*, 560*d*) based on the milk flow rates (310*a*, 310*b*, 410*a*, 410*b*, 510*a*, 510*b*, 510*c*, 510*d*) of at least one of the teats during at least the commencing section (340a, 340b, 440a, 440b) of at least one said milk session (220a, 220b, 220c) at a point in time (350a, 350b, 450a, 450b, 550a, 550b, 550c, 550d) of the commencing section (340a, 340b, 440a, 440b) of at least one said milk session (220b) of the animal (101);

wherein the determined criterion (360a, 360b, 460a, 460b, 560a, 560b, 560c, 560d) comprises a gradient of the milk flow rates (310a, 310b, 410a, 410b, 510a, 510b, 510c, 510d) at the point in time (350a, 350b, 450a, 450b, 550a, 550b, 550c, 550d) of the commencing section (340a, 340b, 440a, 440b) of at least one said milk session (220b) of the animal (101);

set a point in time of a subsequent milk permission (210c) between the a most recent said milk session (220b) and a subsequent milk session (220c) of the animal (101), based on the determined criterion (360a, 360b, 460a, 460b, 560a, 560b, 560c, 560d); and allow the robotic arm (117) of the milk extracting arrangement (110) to attach the teat cups (111) to the teats of the animal (101) when the set point in time of the subsequent milk permission (210c) has passed.

2. The milk system (100) according to claim 1, wherein the database (130) is configured to store the milk flow data (300, 400, 500) of a plurality of the milk sessions (220a, 220b) of the animal (101);

wherein the control unit (120) is further configured to evaluate the milk flow data (300, 400, 500) of the plurality of milk sessions (220a, 220b) of the animal (101) obtained from the database (130) and determine a reference criterion interval (370, 470, 570) based on the evaluated milk flow data (300, 400, 500); and wherein the point in time of the subsequent milk permission (210c) is set, based on a comparison between the determined criterion (360a, 360b, 460a, 460b, 560a, 560b, 560c, 560d) and the determined reference criterion interval (370, 470, 570).

3. The milk system (100) according to claim 1, wherein the determined criterion (360a, 360b, 460a, 460b, 560a, 560b, 560c, 560d) comprises a curvature section of a plot of the milk flow rates as a function of time (310a, 310b, 410a, 410b, 510a, 510b, 510c, 510d) at the point in time (350a, 350b, 450a, 450b, 550a, 550b, 550c, 550d) of the commencing section (340a, 340b, 440a, 440b) of at least one said milk session (220b) of the animal (101).

4. The milk system (100) according to claim 1, wherein the control unit (120) is further configured to compare the determined gradient (360a, 360b, 460a, 460b, 560a, 560b, 560c, 560d) with a reference gradient interval (370, 470, 570); and set the point in time of the subsequent milk permission (210c) of the subsequent milk session (220c) for the animal (101) to a milk interval (230b) between the most recent milk session (220b) and the point in time of the subsequent milk permission (210c), in relation to a previously applied said time period of the milk interval (230a) for the animal (101) by either increasing the milk interval (230b) when the determined gradient (360a, 360b, 460a, 460b, 560a, 560b, 560c, 560d) is smaller than the reference gradient interval (370, 470, 570); or decreasing the milk interval (230b) when the determined gradient (360a, 360b, 460a, 460b, 560a, 560b, 560c, 560d) exceeds the reference gradient interval (370, 470, 570); or otherwise maintain the previously applied milk interval (230b) when the determined gradient (360a, 360b, 460a, 460b, 560a, 560b, 560c, 560d) is within the reference gradient interval (370, 470, 570).

5. The milk system (100) according to claim 1, wherein the control unit (120) is further configured to determine the point in time (350a, 350b, 450a, 450b, 550a, 550b, 550c, 550d) in the commencing section (340a, 340b, 440a, 440b) of the milk session (220b), based on detection of when a main milking phase of alveolar milk release commences.

6. The milk system (100) according to claim 5, wherein the control unit (120) is further configured to determine the point in time (350a, 350b, 450a, 450b, 550a, 550b, 550c, 550d) of the commencing section (340a, 340b, 440a, 440b) of the milk session (220b), based on evaluation of the milk flow data (300, 400, 500) obtained from the database (130).

7. The milk system (100) according to claim 5, wherein the control unit (120) is further configured to determine the point in time (350a, 350b, 450a, 450b, 550a, 550b, 550c, 550d) in the commencing section (340a, 340b, 440a, 440b) of the milk session (220b), based on a predetermined point in time from commencement (320, 420) of the milk session (220a, 220b, 220c).

8. The milk system (100) according to claim 6, comprising a milk conductivity meter (113), communicatively connected to the control unit (120), wherein the milk conductivity meter (113) is configured to measure conductivity of milk extracted during the commencing section (340a, 340b, 440a, 440b) of the milk session (220a, 220b, 220c); and wherein the control unit (120) is further configured to obtain, repeatedly, conductivity measurements of milk extracted during the commencing section (340a, 340b, 440a, 440b) of the milk session (220b) from the milk conductivity meter (113); and determine the point in time (350a, 350b, 450a, 450b, 550a, 550b, 550c, 550d) of the commencing section (340a, 340b, 440a, 440b) of the milk session (220b), based on the obtained conductivity measurements.

9. The milk system (100) according to claim 1, wherein the control unit (120) is further configured to store the set point in time of the subsequent milk permission (210c) associated with the identity reference of the animal (101) in the database (130).

10. The milk system (100) according to claim 5, wherein the control unit (120) is further configured to compare the time period of the milk interval (230b) to the set point in time of the subsequent milk permission (210c) with a maximum allowed time period and disallow setting of the milk interval (230b) to exceed the maximum allowed time period.

11. The milk system (100) according to claim 1, wherein the control unit (120) is further configured to obtain the milk flow rates (310a, 310b, 410a, 410b, 510a, 510b, 510c, 510d);

determine the criterion (360a, 360b, 460a, 460b, 560a, 560b, 560c, 560d) based on the obtained milk flow rates (310a, 310b, 410a, 410b, 510a, 510b, 510c, 510d);

set the point in time of the subsequent milk permission (210c); and allow the robotic arm (117) of the milk extracting arrangement (110) to attach the teat cups (111) to the teats of the animal (101) in real time, continuously during a lactation period of the animal (101).

12. The milk system (100) according to claim 1, wherein the milk extracting arrangement (110), the animal identifier device (116), the milk flow meter (112), and the time measurement device (119) are physically situated at a farm while the database (130) and the control unit (120) are physically situated at a distance from the farm, yet communicatively connected to the entities of the milk system (100) situated at the farm.

13. The milk system (100) according to claim 1, wherein the control unit (120) is further configured to calculate a capacity utilization of the milk extracting arrangement (110); and output an indication that the milk extracting arrangement (110) has capacity to serve a number of animals per time unit which is different from a currently served number of animals per time unit, based on the calculated capacity utilization.

* * * * *